US007027037B2

(12) United States Patent
Dowd

(10) Patent No.: US 7,027,037 B2
(45) Date of Patent: Apr. 11, 2006

(54) CONDITIONALLY ILLUMINATED KEYPAD LEGENDS

(75) Inventor: Timothy J. Dowd, Everett, WA (US)

(73) Assignee: Intermec IP Corp., Woodland Hills, CA (US)

( * ) Notice: Subject to any disclaimer, the term of this patent is extended or adjusted under 35 U.S.C. 154(b) by 343 days.

(21) Appl. No.: 10/410,530

(22) Filed: Apr. 8, 2003

(65) Prior Publication Data

US 2004/0201568 A1 Oct. 14, 2004

(51) Int. Cl.
*G09G 5/00* (2006.01)

(52) U.S. Cl. ...................................... 345/170; 345/172

(58) Field of Classification Search ................ 345/168, 345/170, 172; 341/22, 23; 200/308–314
See application file for complete search history.

(56) References Cited

U.S. PATENT DOCUMENTS 3,863,060 A 1/1975 Rode et al. ................. 235/156
3,934,246 A * 1/1976 Mueller ...................... 345/170
3,955,074 A 5/1976 Rodé et al. ................. 235/156
4,117,542 A 9/1978 Klausner et al. ............ 364/900
4,279,021 A 7/1981 See et al. ................... 364/900
4,280,121 A * 7/1981 Crask .......................... 341/23
4,542,478 A 9/1985 Hashimoto et al. ......... 364/900
4,567,573 A 1/1986 Hashimoto et al. ......... 364/900
4,825,464 A 4/1989 Wen ........................... 379/354
5,056,798 A 10/1991 Wehrley ..................... 273/460
5,161,118 A 11/1992 Matsuda et al. ............ 364/744
5,164,723 A * 11/1992 Nebenzahl ................... 341/23
5,236,199 A 8/1993 Thompson, Jr. ............ 273/439
5,267,181 A 11/1993 George .................. 364/709.12
5,272,321 A 12/1993 Otsuka et al. .............. 235/381
5,383,141 A 1/1995 Lapeyre ................. 364/709.16
5,404,321 A 4/1995 Mattox .................. 364/709.01
5,408,060 A * 4/1995 Muurinen ................... 200/314
5,452,439 A * 9/1995 Makino ...................... 715/710
5,455,414 A 10/1995 Wang ......................... 235/462
5,487,616 A 1/1996 Ichbiah ....................... 400/489
5,504,315 A 4/1996 Hardesty et al. ............ 235/462
5,569,901 A 10/1996 Bridgelall et al. .......... 235/470
5,790,103 A 8/1998 Willner ...................... 345/168
5,919,239 A 7/1999 Fraker et al. ................. 701/35
5,936,554 A * 8/1999 Stanek ........................ 341/22
5,950,809 A * 9/1999 Andre ........................ 200/314
6,092,903 A * 7/2000 Higgins, Jr. .................. 362/30
6,141,436 A 10/2000 Srey et al. .................. 382/124
6,281,812 B1 * 8/2001 Kim ............................ 341/23
6,797,902 B1 * 9/2004 Farage et al. ............... 200/314
6,805,506 B1 * 10/2004 Bar-Yona .................... 400/485
2002/0071705 A1 * 6/2002 Zilberman et al. .......... 400/472

* cited by examiner

*Primary Examiner*—Sumati Lefkowitz
*Assistant Examiner*—Rodney Amadiz
(74) *Attorney, Agent, or Firm*—Seed IP Law Group PLLC

(57) ABSTRACT

A user input device employs a number of legends that are selectively illuminable to indicate an active one of alternative input values of a user selectable key.

24 Claims, 14 Drawing Sheets

CONDITIONALLY ILLUMINATED KEYPAD LEGENDS

BACKGROUND OF THE INVENTION

1. Field of the Invention

The present invention relates to user input devices for computing, transmitting, and/or collecting data, and more particularly, to keypads or keyboards for such devices and methods for operating the same.

2. Description of the Related Art

Devices for computing or collecting data are becoming progressively smaller while their functionality is progressively increasing. User input devices, such as personal digital assistants (PDAs), are becoming increasingly more prevalent. As these devices become increasingly smaller, the keypad area available for user input devices correspondingly decreases. To save space, the keys on of many of these devices often serve multiple purposes.

Keys capable of inputting more than one input value typically have more than one legend located on, or near, the key to map the key to the more than one input value associated with the key. For instance, a single key capable of inputting three different input values may have three different legends proximate to the key to inform the user of the various input values that may be input by activation of the key.

It is often difficult to ascertain which of the possible input values represented by the legends is active (i.e., the value that will be entered by selection of the key). Thus, the user often selects a particular key expecting to input a desired value only to find that the set of input values which includes the desired value is not the currently active set of input values. As a result, an incorrect value is entered, which will require further key manipulations by the user to correct. Such errors lead to user inefficiencies and customer dissatisfaction.

BRIEF SUMMARY OF THE INVENTION

The present invention provides a user input device having at least a first light source and a plurality of user selectable switches. According to principles of the present invention, at least a number of the user selectable switches are selectively operable to input at least two alternative input values. For each of the number of user selectable switches, at least a first and a second legend proximate to the user selectable switch identifies a respective one of the alternative input values of the user selectable switch. The legends are selectively illuminable to indicate an active one of the alternative input values of the user selectable switch.

In one embodiment, at least one of the plurality of the user selectable switches is selectively operable to make a first set of input values active for each of the number of user selectable switches.

In another embodiment, the first light source has a plurality of first optical fibers and selectively couples light from the first light source to the first legends of each of the number of user selectable switches. Further, a second light source has a second plurality of optical fibers and selectively couples light from the second light source to the second legends of each of the number of user selectable switches.

In yet another embodiment, the at least one light source includes a number of light sources of a first color and a number of light sources of a second color. Each of the number of light sources of the first color selectively illuminates a respective one of the first legends of each of the number of user selectable switches and each of the number of light sources of the second color selectively illuminates a respective one of the second legends of each of the number of user selectable switches.

In a further embodiment, the at least one light source includes a first and a second number of light sources. Each of the first number of light sources selectively couples light through a respective one of a first colored filter and illuminates a respective one of the first legends of each of the number of user selectable switches with a first color. Each of the second number of light sources selectively couples light through a respective one of a second colored filter and illuminates a respective one of the second legends of each of the number of user selectable switches with a second color.

In yet a further embodiment, the at least one light source includes a plurality of lights sources and each of the plurality of light sources selectively couples light through a plurality of filters. The plurality of filters includes at least a first and a second colored filter. Light coupling through the first colored filter of each of the plurality of filters illuminates a respective one of the first legends of each of the number of user selectable switches with a first color. Light coupling through the second colored filter of each of the plurality of filters illuminates a respective one of the second legends of each of the number of user selectable switches with a second color.

BRIEF DESCRIPTION OF THE SEVERAL VIEWS OF THE DRAWINGS

In the drawings, identical reference numbers identify similar elements or acts. The size and relative positions of elements in the drawings are not necessarily drawn to scale. For example, the shapes of various elements are not drawn to scale, and some of these elements are arbitrarily enlarged and/or positioned to improve drawing legibility. Further, the particular shapes of the elements, as drawn are not intended to convey any information regarding the actual shape of the particular elements, and have been solely selected for their ease in recognition of the drawings.

DETAILED DESCRIPTION OF THE INVENTION

In the following description, certain specific details are set forth in order to provide a thorough understanding of various embodiments of the present invention. However, one of ordinary skill in the art will understand that the present invention may be practiced without these details. In other instances, well-known structures associated with user input devices, keys, keypads, keyboards, electrical circuits, and circuit elements have not been shown or described in detail to avoid unnecessarily obscuring descriptions of the embodiments shown.

Unless the context requires otherwise, throughout the specification and claims which follow, the word "comprise" and variations thereof, such as "comprises" and "comprising," are to be construed in an open, inclusive sense, that is as "including, but not limited to."

Further, while certain embodiments of the present invention are described in the context of a hand-held device, the embodiments of the present invention are not limited to hand-held devices, but may be used in any user input device comprising a keypad or a keyboard. For example, while the illustrations shown in FIGS. 1 and 2 depict a hand-held device, it will be understood by one of ordinary skill in the art that the user input device of the present invention is applicable to a variety of nonhand-held uses, such as, for example, keyboards for desktop computers, laptop computers, or musical instruments.

Figure 1:
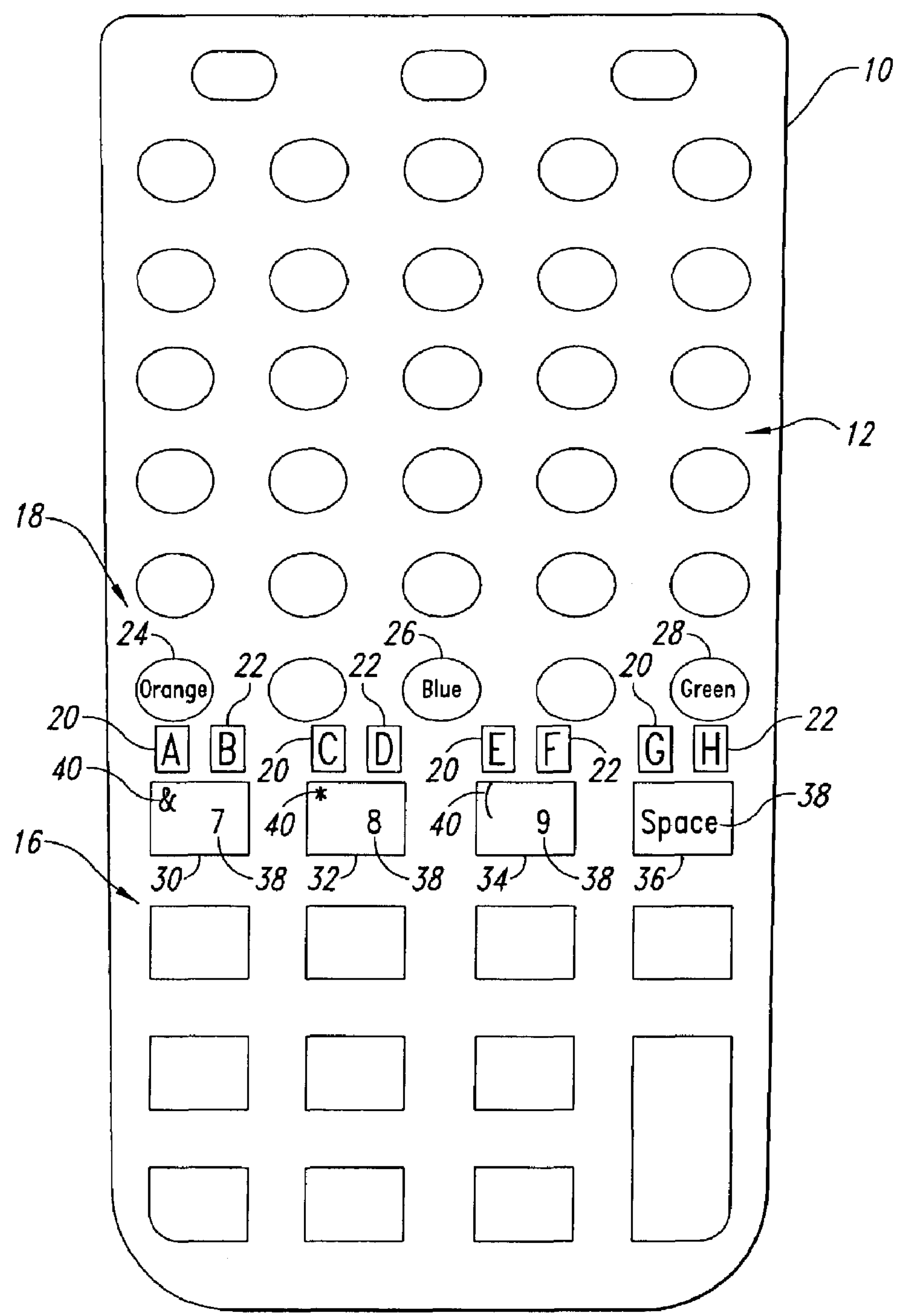
FIG. 1 is a top plan view of a keypad for a user input device according to one embodiment of the present invention.
Figure 2:
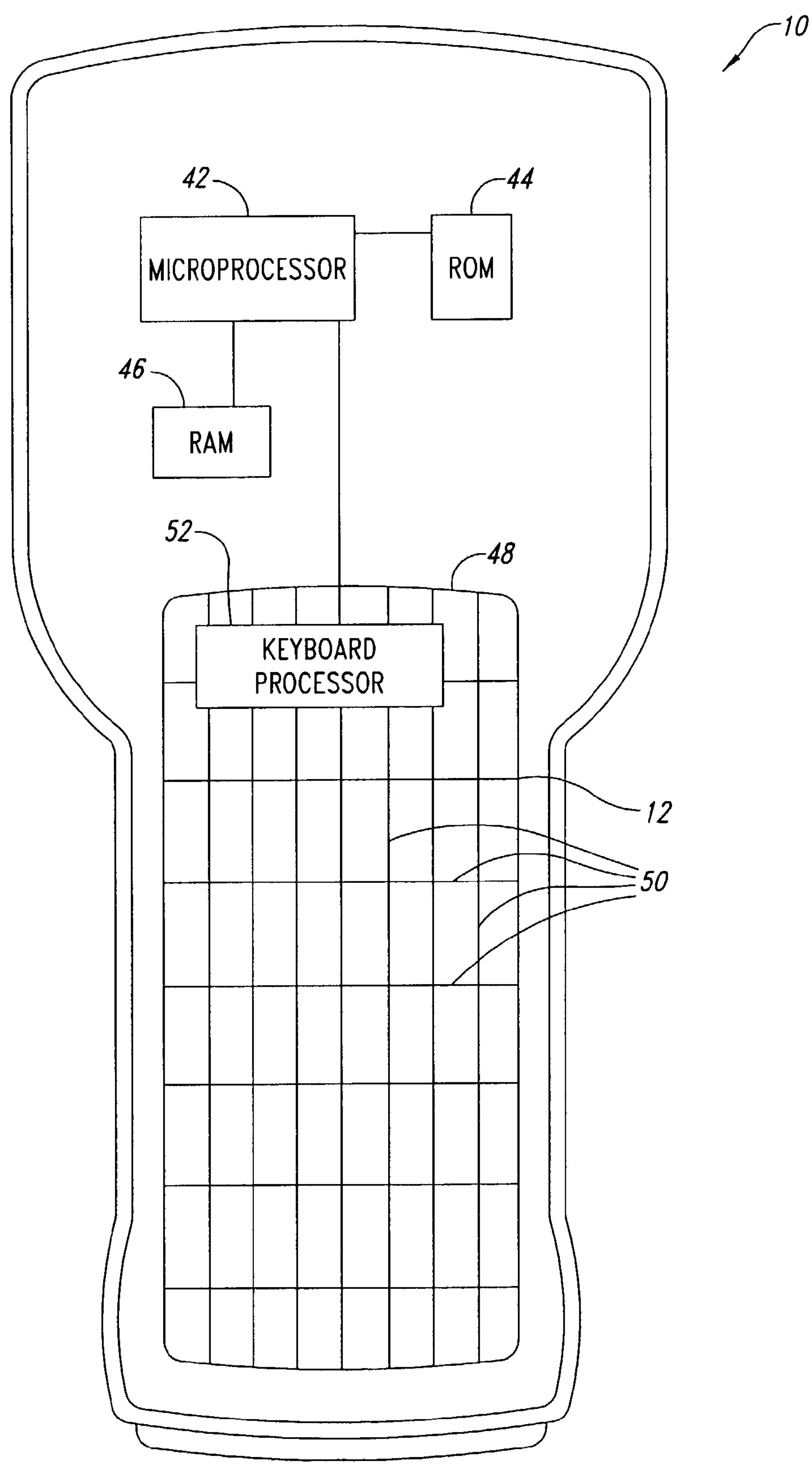
FIG. 2 is a block diagram of the electrical components of one illustrated embodiment of a user input device.

FIG. 1 shows a user input device 10 comprising a keypad 12 and at least a first and a second set of user selectable keys 16, 18, respectively. The first set of keys 16 comprises keys 30, 32, 34, and 36, each selectively operable for entering respective input values to the user input device 10. The second set of keys 18 comprises mode keys 24, 26, and 28, each selectively operable to make one of the input values active for each of the keys in the first set of keys 16.

The keypad 12 also includes at least a first group of indicia or legends 20, and a second group of indicia or legends 22. A respective legend from each of the first and second group of legends 20, 22 is proximate to each of the first set of keys 16. The first and second legends 20, 22 depict alternative input values that can be selected or entered by actuating the corresponding one of the keys in the first set of keys 16. In order to indicate which one of the alternative input values is active, the first and second legends 20, 22 are selectively illuminable.

For keys 30, 32, 34, and 36, each of the first legends 20 depicts a respective one of a first set of input values, comprising "A," "C," "E," and "G." Also for keys 30, 32, 34 and 36, each of the second legends 22 depicts a respective one of a second set of input values, comprising "B," "D," "F," and "H."

A single indicia or label is positioned proximate or on each of the keys in the second set of keys 18. For example, mode key 24 is labeled "Orange" and is illuminable with an orange color, mode key 26 is labeled "Blue" and is illuminable with a blue color, and mode key 28 is labeled "Green" and is illuminable with a green color.

As shown in FIG. 2, the user input device 10 includes a microprocessor 42 coupled to a read-only (ROM) 44 and a random access memory (RAM) 46 to form a general-purpose computer as is generally known in the art. The user input device 10 further includes keypad circuitry 48 including exemplary traces 50. The keypad circuitry 48 divides the keypad 12 into a matrix, for example an 8×8 matrix. The keypad circuitry includes a keypad processor and buffer 52 coupling the keypad circuitry 48 to the microprocessor 42. The keypad processor 52 constantly scans the circuits to detect the selection and/or release of a key.

Figure 3:
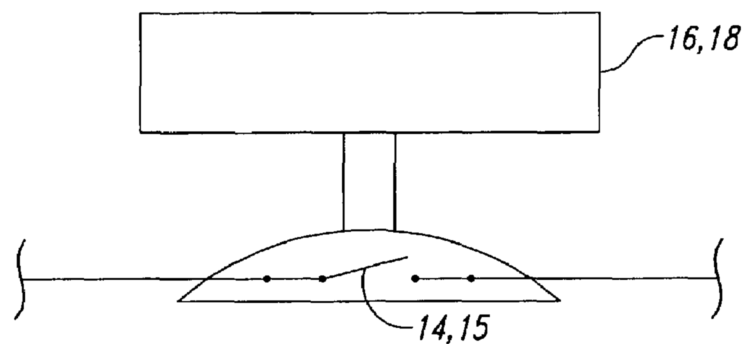
FIG. 3 is a schematic diagram of one illustrated embodiment of a key and switch structure.

FIG. 3 shows a switch 14 selectively actuatable by the key. The illustration is representative of any of the keys of the first or second set of keys 16, 18. When any one of the keys of the first or second set of keys 16, 18 is selected or released, a respective switch 14 is activated or deactivated to change the amount of current flowing through a circuit associated specifically with the user selectable switch 14, 15 for that key. Upon selection or release of the key, the keypad processor 52 generates an output in the form of a "virtual key" corresponding to a matrix address of the key (e.g., 1,1 through 8,8), which is temporarily buffered for eventual relay to the microprocessor 42.

A keyboard driver employs matrix tables to convert the virtual key to a scan code. The operating system of the user input device 10 examines the scan code to determine whether the scan code corresponds to a selection of one of the second set of keys (i.e., mode key) 18, such as, for example, the "Orange" mode key 24 or the "Blue" mode key 26. If the scan code does correspond to a selection of one of the second set of keys, the operating system records which mode key selected. If the scan code does not correspond to a selection of one of the second set of keys 18, the operating system examines the scan code to determine whether the scan code corresponds to a selection of one of the alternative input values. However, if the scan code corresponds to a selection of one of the alternative input values, the keyboard driver employs a scan code table to convert the scan code into a particular ASCII code for the selected input value based on the previously selected mode key.

As an example, when the "Orange" mode key 24 is selected, an orange color illuminates from each of the first legends 20 to inform the user of the input device 10 that each of the input values from the first set of input values is the active input value for each of the first set of user selectable switches 14. Similarly, when the "Blue" mode key 26 is selected, a blue color illuminates from each of the second legends 22 to inform the user of the input device 10 that each of the input values from the second set of input is the active input value for each of the first set of user selectable switches 14.

Since more than two alternative input values may be assigned to each key of the first set of user selectable switches 14, the present embodiment is depicted with yet a third and a fourth group of legends 38, 40, respectively, for each of the first set of keys 16. In this example, each of the third legends 38 depicts a respective one of a third set of input values/functions for keys 30, 32, 34 and 36 (i.e., "7"

"8" "9" and "Space"), and each of the fourth legends 40 depicts a respective one of a fourth set of input values (i.e., "&" "*" and "("). As with the "Orange" and "Blue" mode keys, 24 and 26, when the "Green" mode key 28 is selected, a green color illuminates from each of the third legends 38 to inform the user of the input device 10 that each of the input values from the third set of input values is the active input value for each of the first set of user selectable switches 14.

Although the embodiment shown in FIG. 1 does not illustrate a mode key dedicated to the function of activating the respective input values depicted by each of the legends in the fourth set 40, it will be understood by one of ordinary skill in the art, that this may be done in a similar fashion to that of the first and second sets of legends 20, 22. For example, yet a fourth mode key in yet another color can be employed to activate each of the input values from the fourth set of input values for each of the first set of user selectable switches 14. In another example, the user input device 10 can be designed such that when no mode key is selected within a predetermined period of time, each of the respective input values from the fourth set of input values is, by default, the active value for each of the first set of user selectable switches 14. In yet another example, each of the input values from the fourth set of input values can be the active value for each of the first set of user selectable switches 14 by selecting a dedicated key in combination with another key, such as in combination with one of the above-mentioned mode keys 24, 26 28.

To exemplify the key selections of the input device 10 with the keypad 12 illustrated in FIG. 1, when, for instance, a user of the user input device 10 wishes to spell the word "BAD," he or she can (1) select the "Blue" mode key 26 to activate the second alternative input values and cause the second group of legends 22 to illuminate; (2) select key 30 proximate to the blue illuminated second legend 22 depicting the alpha-character "B;" (3) select the "Orange" mode key 24 to activate the first set of alternative input values and cause the first group of legends 20 to illuminate; (4) re-select key 30 proximate to the orange illuminated first legend 20 depicting the alpha-character "A;" (5) re-select the "Blue" mode key 26 to reactivate the second set of alternative input values and cause the second group of legends 22 to re-illuminate; and (6) select key 32 proximate to the blue illuminated second legend 22 depicting the alpha-character "D."

As Will be understood by one of ordinary skill in the art, "selecting" a key means depressing, contacting, or otherwise activating the key. In one embodiment, a single selection of one of the second set of keys (i.e., mode keys) 18 affects only the next immediately succeeding key selection. Thus, when the user wishes to spell the word "CAB," the user can (1) select the "Orange" mode key 24; (2) select key 32 proximate to the orange illuminated first legend 20 depicting the alpha-character "C;" (3) re-select the "Orange" mode key 24; (4) select the key 30 proximate to the orange illuminated first legend 20 depicting the alpha-character "A;" (5) select the "Blue" mode key 26; and (6) select key 30 proximate to the blue illuminated second legend 22 depicting the alpha-character "B."

In another embodiment, each of the second set of keys 18 or another function key on the keypad 12 can be configured to act as a shift-lock key. For example, two rapid selections of one of the mode keys 18 can affect all subsequent entries until another action is taken, such as selecting the same or different key in the second set of keys 18. Thus, when the "Orange" mode key 24 functions as a locked mode key, and the user wishes to spell the word "CAB," the user can (1) select key 32 proximate to the orange illuminated first legend 20 depicting the alpha-character "C;" (2) select key 30 proximate to the orange illuminated first legend 20 depicting the alpha-character "A;" (3) select the "Blue" mode key 26 to unlock mode key 24 and activate input values associated with the second group of legends 22; and (4) select key 30 proximate to the blue illuminated second legend 22 depicting the alpha-character "B."

In yet another embodiment, a single selection of any of the mode keys 18 "locks" the selected mode key (e.g., key 24, 26 or 28) until yet another mode key 18 is selected.

As will be understood by one of ordinary skill in the art, the user input device 10 may employ a variety of structures to illuminate each of the first and second legends 20, 22, and any additional legends. A number of particularly suitable embodiments are explained below.

Figure 4:
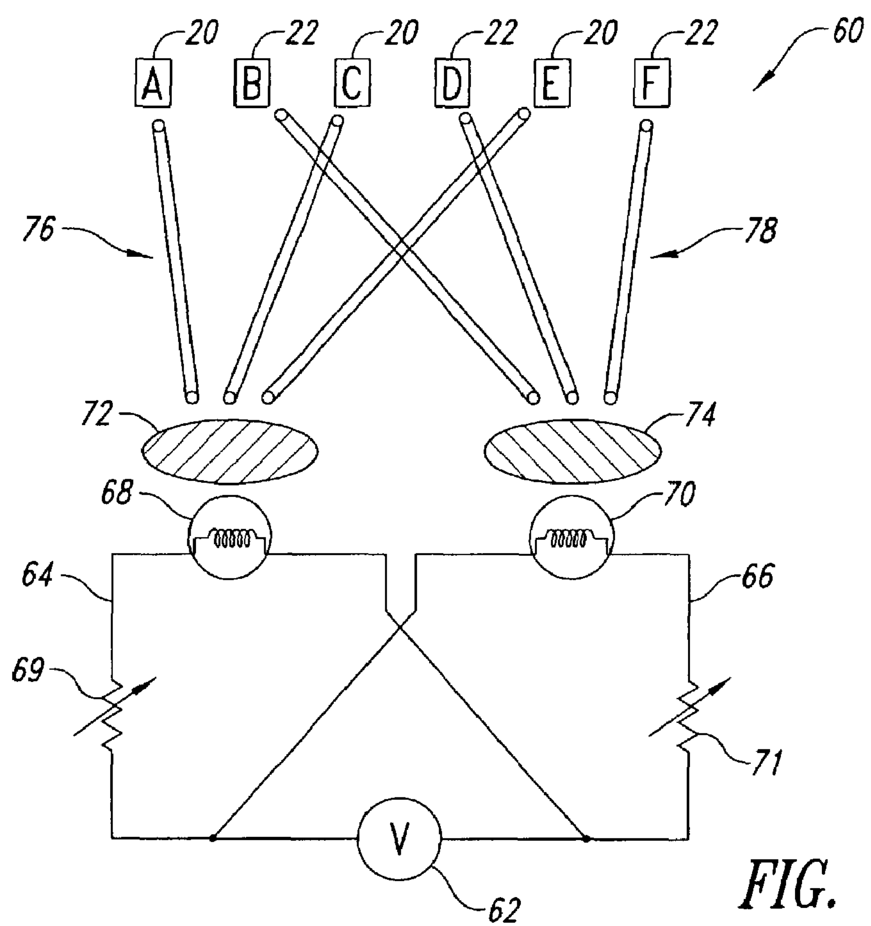
FIG. 4 is a schematic diagram of one illustrated embodiment of an illumination system for illuminating keypad legends of the user input device.

FIG. 4 shows an optical fiber system 60 to illuminate the legends 20, 22 according to one illustrated embodiment. A power source 62 supplies power to a first and second circuit, 64 and 66, respectively. The first circuit 64 comprises a first light source 68 and a first variable resistor 69. Similarly, the second circuit 66 comprises a second light source 70 and a second variable resistor 71. Proximate to the first light source 68 is a first colored filter 72, and proximate to the second light source 70 is a second colored filter 74 of a different color than the first colored filter 72. Each of the first and the second colored filters 72, 74 selectively filters light which is coupled to each of the first and the second legends 20, 22 via a respective first and a second optical fiber network 76, 78.

For example, with respect to the embodiment illustrated in FIG. 1, the first colored filter 72 can be orange to couple orange light to each of the first legends 20 when the "Orange" mode key 24 is selected, and the second colored filter 74 can be blue to couple blue light to each of the second legends 22 when the "Blue" mode key 26 is selected.

The resistance of the first and second resistors 69, 71 is adjustable to selectively increase and/or decrease the intensity of the light coupled to each of the first or the second legends 20, 22. For example, if the first set of alternative input values is the active set of input values, it may be desirable to illuminate only the first legends, while not illuminating the second legends 22. Alternatively, in another embodiment, if the first set of alternative input values is the active set of input values, it may be desirable to illuminate the first legends 20 at a higher intensity level than the second legends 22.

Figure 5:
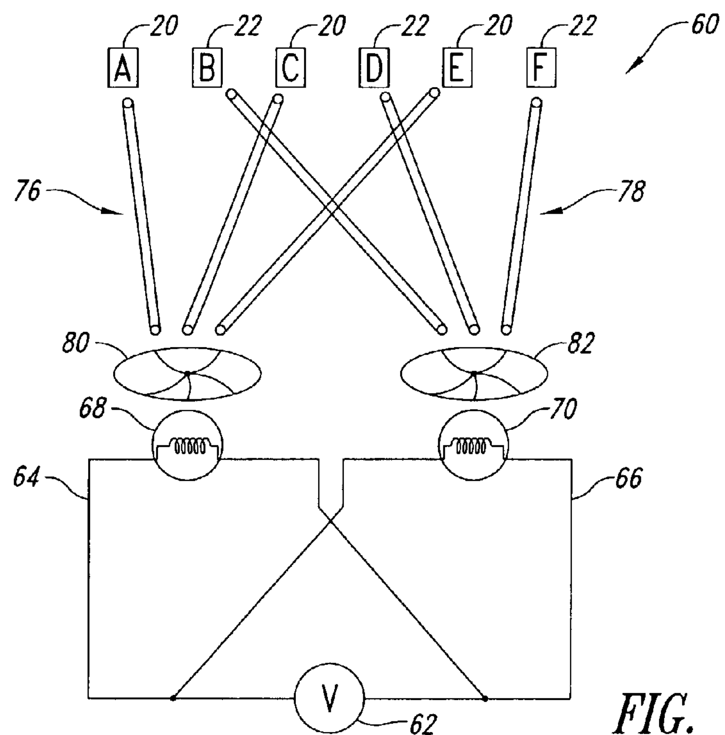
FIG. 5 is a schematic diagram of another illustrated embodiment of an illumination system for illuminating keypad legends of the user input device.

FIG. 5 shows another optical fiber system 60 to illuminate the legends 20, 22 according to another illustrated embodiment. This alternative embodiment, and those alternative embodiments and other alternatives described herein, are substantially similar to previously described embodiments, and common acts and structures are identified by the same reference numbers. Only significant differences in operation and structure are described below.

As shown in FIG. 5, the legends 20, 22 are illuminated to indicate which set of alternative input values is the active set without the use of color. A first diaphragm 80 (instead of, or in addition to, a first colored filter 72) is proximate to the first light source 68 and a second diaphragm 82 (instead of, or in addition to, a second colored filter 74) is proximate to the second light source 68. Each of the respective first and second diaphragms 82, 84 can open to allow light to couple from the respective first and the second light source 68 to each of the first legends and second legends 20, 22 via the respective optical fiber networks 76, 78.

In one embodiment for operating the diaphragms, when the first set of alternative input values are the active input values, the first diaphragm 82 is open to illuminate each of the first legends 20 and the second diaphragm 84 is closed such that each of the second legends 22 is not illuminated. In another embodiment, when the first set of alternative input values is the active set of input values, the first diaphragm 84 is open to a greater degree than the second diaphragm 86, and thus each of the first legends 20 are illuminated at a higher intensity level than each of the second legends 22. By varying the intensity level of the light coupled to each of the legends 20, 22 through the use of diaphragms, resistors in this embodiment are not required.

Figure 6:
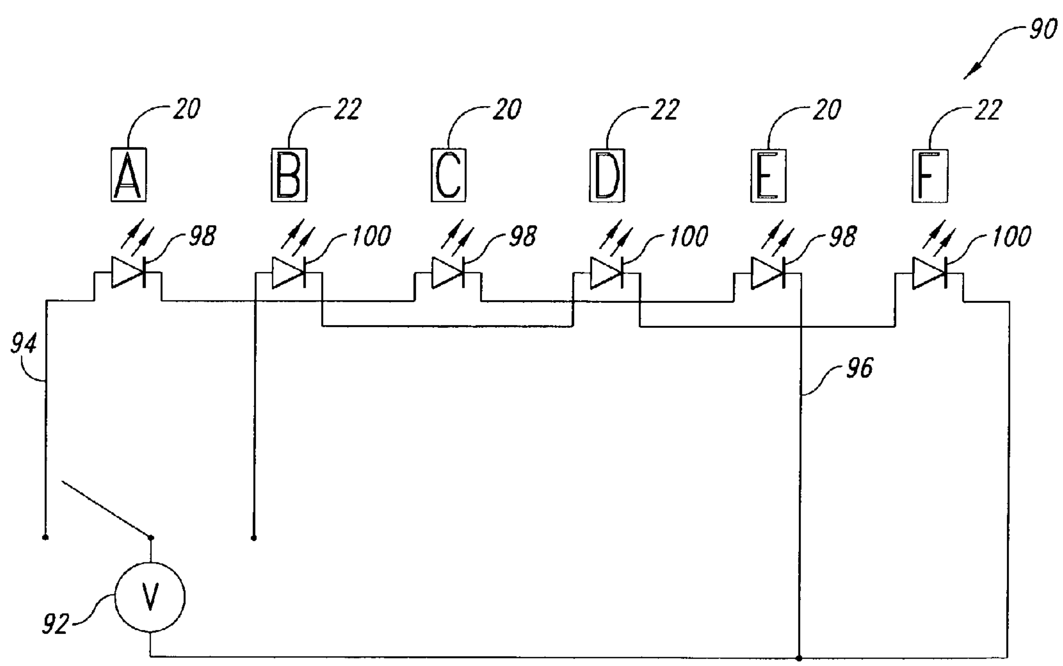
FIG. 6 is a schematic diagram of yet another illustrated embodiment of an illumination system for illuminating keypad legends of the user input device.

FIG. 6 shows another system 90 to illuminate the legends 20, 22 according to another illustrated embodiment. A power source 92 supplies power to a first and a second circuit, 94 and 96, respectively. The first circuit 94 comprises a number of first light emitting diodes (LEDs) 98, each proximate to a respective one of the first legends 20, and second circuit 96 comprises a number of second LEDs 100, each proximate to a respective one of the second legends 22. The first LEDs 98 can be of a first color (e.g., orange to correspond to the orange mode key 24 shown in FIG. 1), and the second LEDs 100 can be of a second color (e.g., blue to correspond to the blue mode key 26 shown in FIG. 1). In this way, each of the first LEDs 98 can selectively illuminate each of the first legends 20 with a first color when the first set of alternative input values are the active input values, and each of the second LEDs 100 can selectively illuminate each of the second legends 22 with a second color when the second set of alternative input values are the active input values.

Alternatively, the circuits 94, 94 may include a pair of variable power sources, to provide illumination at different intensity levels.

FIGS. 7–11 illustrate various methods of operating the user input device 10 of the present invention.

Figure 7A:
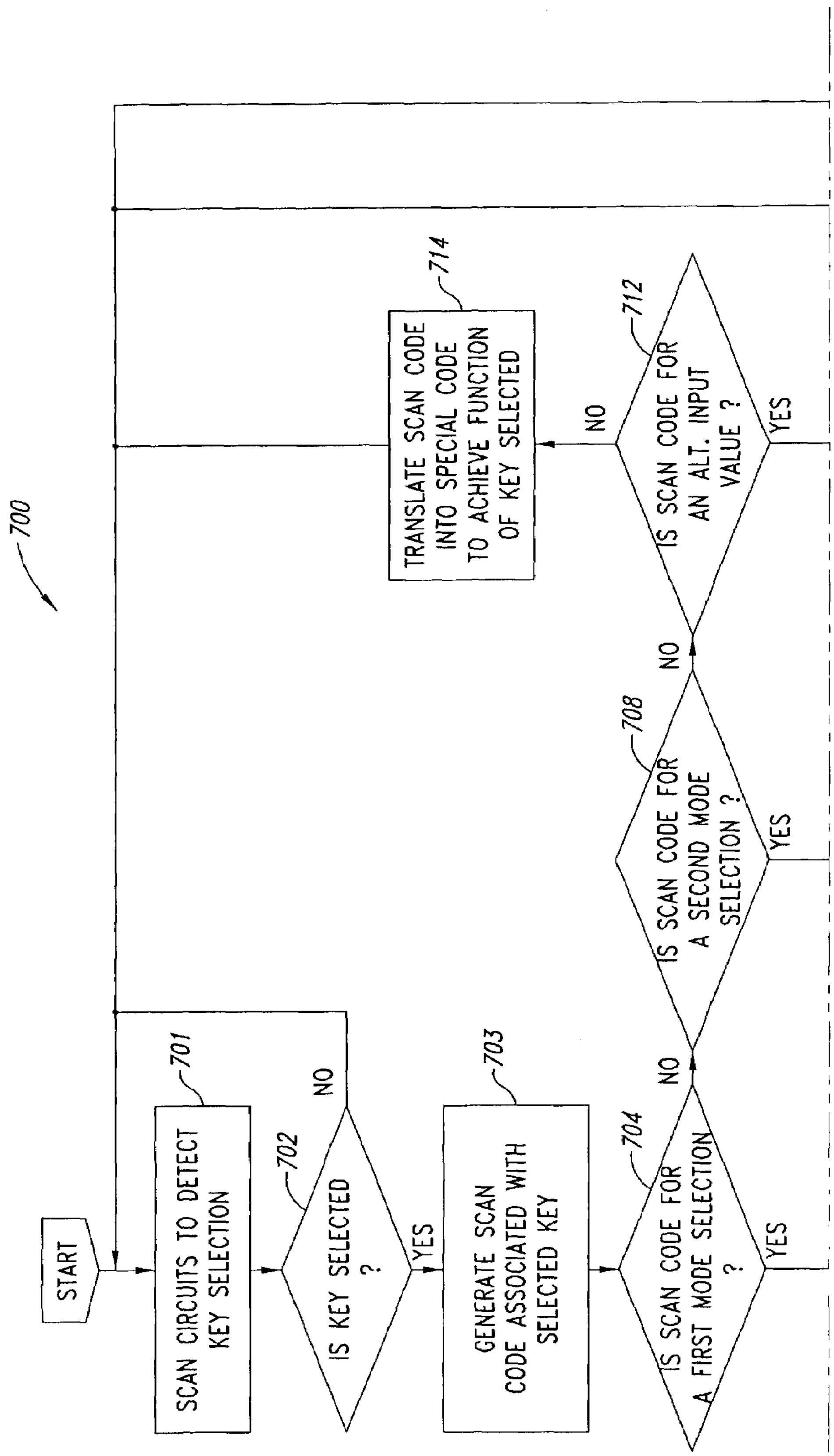
FIGS. 7A and 7B are a flow diagram of one illustrated method for controlling operation of a user input device in which the legends identifying the active input values are illuminated at a higher intensity than the legends identifying the inactive input values.
Figure 7B:
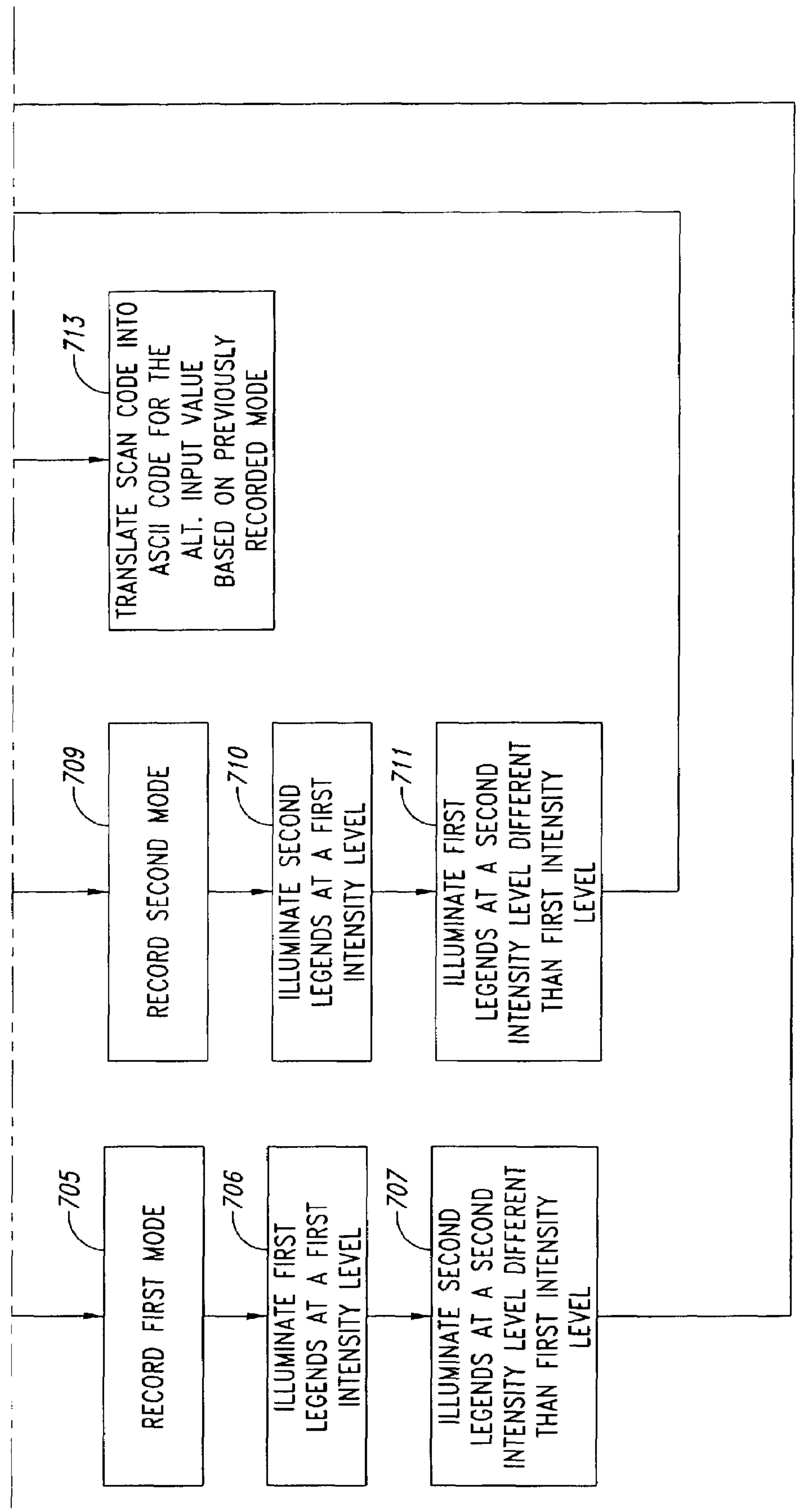

FIGS. 7A and 7B show a method 700 where the legends identifying the active input values are illuminated at a higher intensity than the legends identifying the inactive input values. At step 701, the keyboard processor 52 of the user input device 10 scans the keypad circuitry 48 and, in step 702, determines if any one of the first or second set of keys 16, 18 is selected. If a key is not selected, the keyboard processor 52 returns to step 701. If a key is selected, the keyboard processor 52 generates a scan code associated with the selected key in step 703. In step 704, the keyboard processor 52 determines whether the scan code corresponds to a first mode selection.

If the scan code corresponds to a first mode selection (i.e., if a first one of the second set of keys 18 is selected), control passes to step 705, where the keyboard processor 52 records the first mode, passing control to step 706. At steps 706, 707, the keyboard processor 52 or operating system activates the appropriate circuitry to illuminate each of the first legends 20 at a first intensity level, and each of the second legends 22 at a second intensity level, different than the first intensity level, respectively. The order of steps 706 and 707 is not important, and may even occur simultaneously. Control then returns to step 701 and the method 700 is repeated.

If, at step 704, a determination is made that the scan code is not for a first mode selection, the keyboard processor 52 determines whether the scan code is for a second mode selection in step 708. If the scan code is for a second mode selection (i.e., if a second one of the second set of keys 18 is selected), the keyboard processor 52 records the second mode in step 709, and passes control to step 710. At steps 710, 711, the keyboard processor 52 or operating system activates appropriate circuitry to illuminate each of the second legends 22 at a first intensity level, and each of the first legends 20 at a second intensity level different than the first intensity level, respectively. The order of steps 710 and 711 is not important, and may even occur simultaneously. Control returns to step 701 and the method 700 is repeated.

If, at step 708, a determination is made that the scan code does not correspond to a second mode selection, the keyboard processor 52 determines whether the scan code is for an alternative input value in step 712. If the scan code is for an alternative input value, the keyboard processor 52 translates the scan code for the alternative input value, based on the previously recorded mode, into an ASCII code in step 713.

However, at step 712, a determination is made that the scan code is not for an alternative input value, control passes to step 714 where the scan code is translated into a special code to achieve the function of the selected key. Control then returns to step 701 and the method 700 is repeated.

Figure 8A:
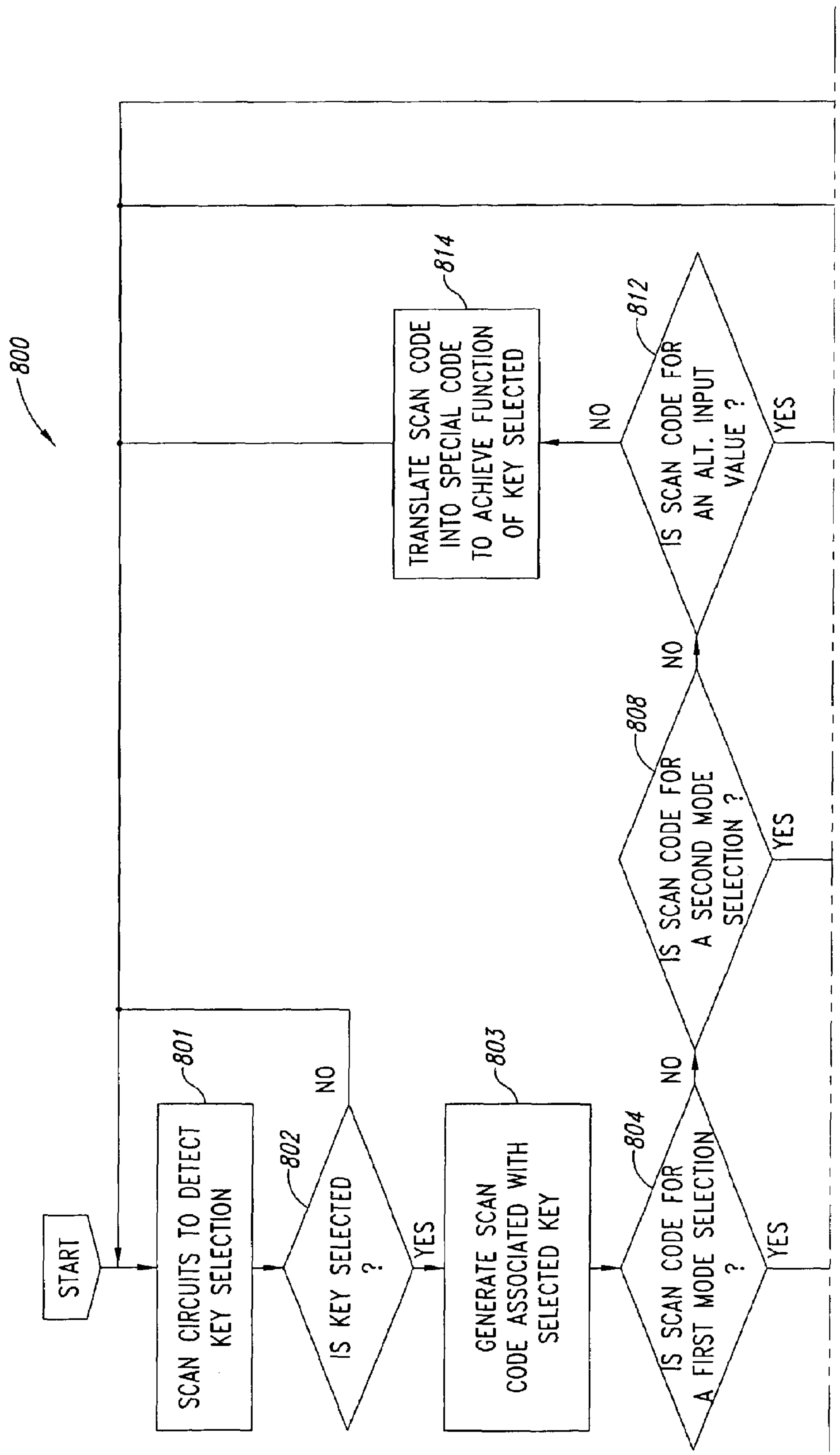
FIGS. 8A and 8B are a flow diagram of another illustrated method for controlling operation of a user input device in which only the legends identifying the active input values are illuminated.
Figure 8B:
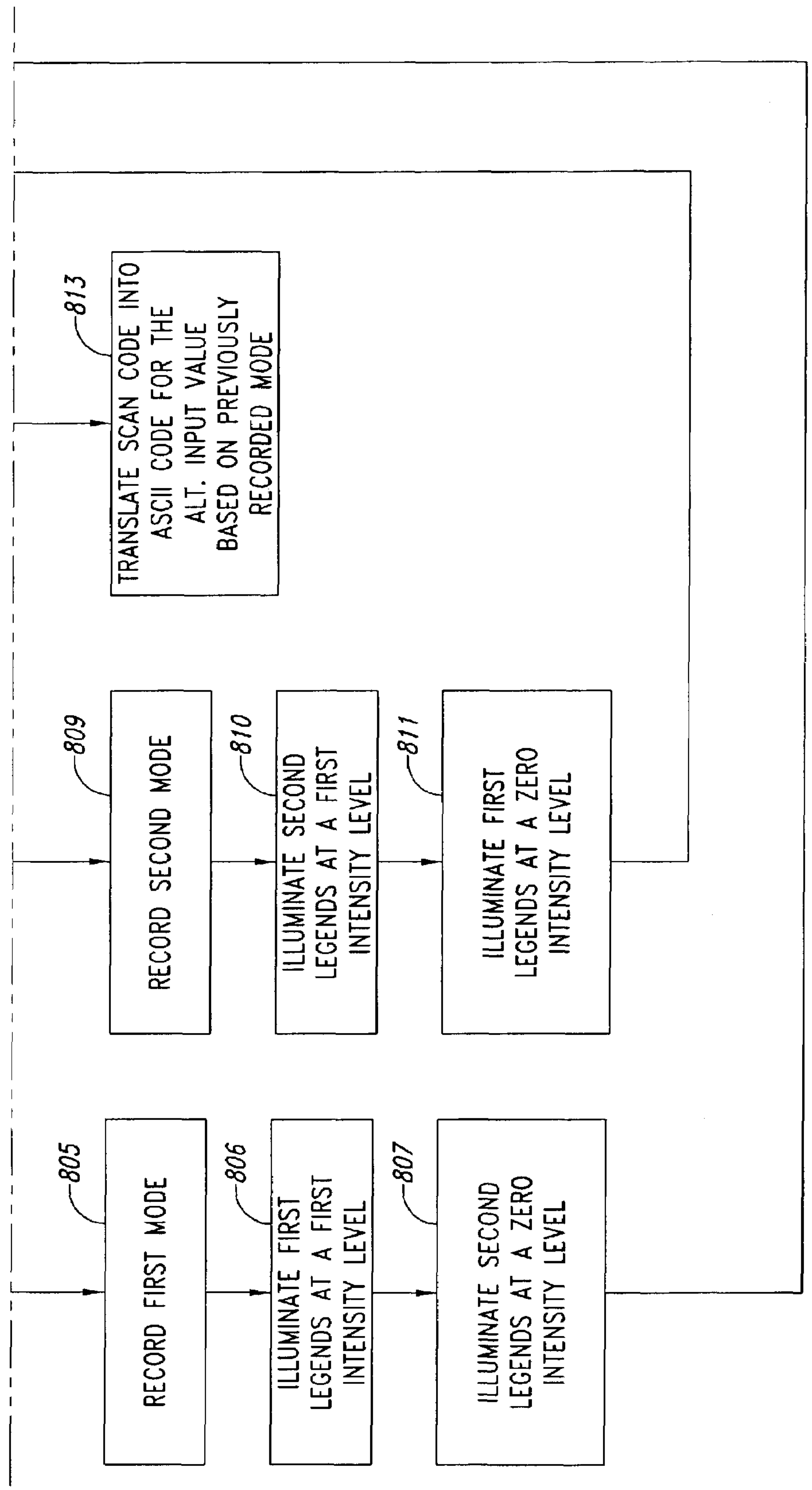

FIGS. 8A and 8B show a method 800 where only the legends identifying the active input values are illuminated. Steps 801–806, steps 808–810, and steps 812–814 are similar to steps 701–706, steps 708–710, and steps 712–714 respectively, of the embodiment shown in FIG. 7. However, at step 807, rather than illuminating each of the second legends 22 as is done in step 707 of the previous embodiment, in this embodiment, each of the second legends 22 are not illuminated. Also, at step 811 rather than illuminating each of the first legends 20 as is done in step 711, in this embodiment, each of the first legends 20 are not illuminated.

Figure 9A:
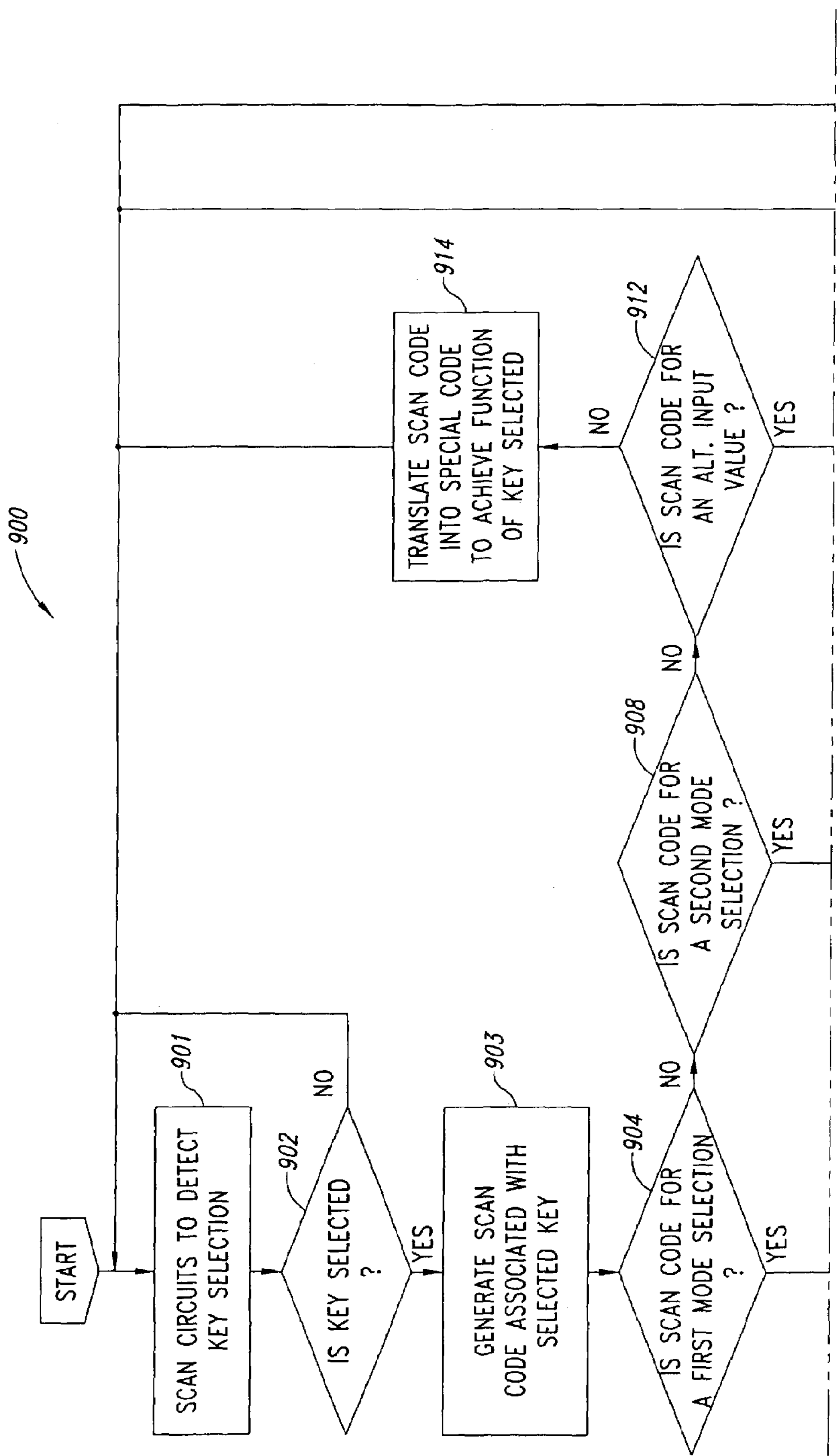
FIGS. 9A and 9B are a flow diagram of another illustrated method for controlling operation of a user input device in which the legends are illuminated at the same intensity, and the legends identifying the active input values are illuminated with a different color than the legends identifying the inactive legends.
Figure 9B:
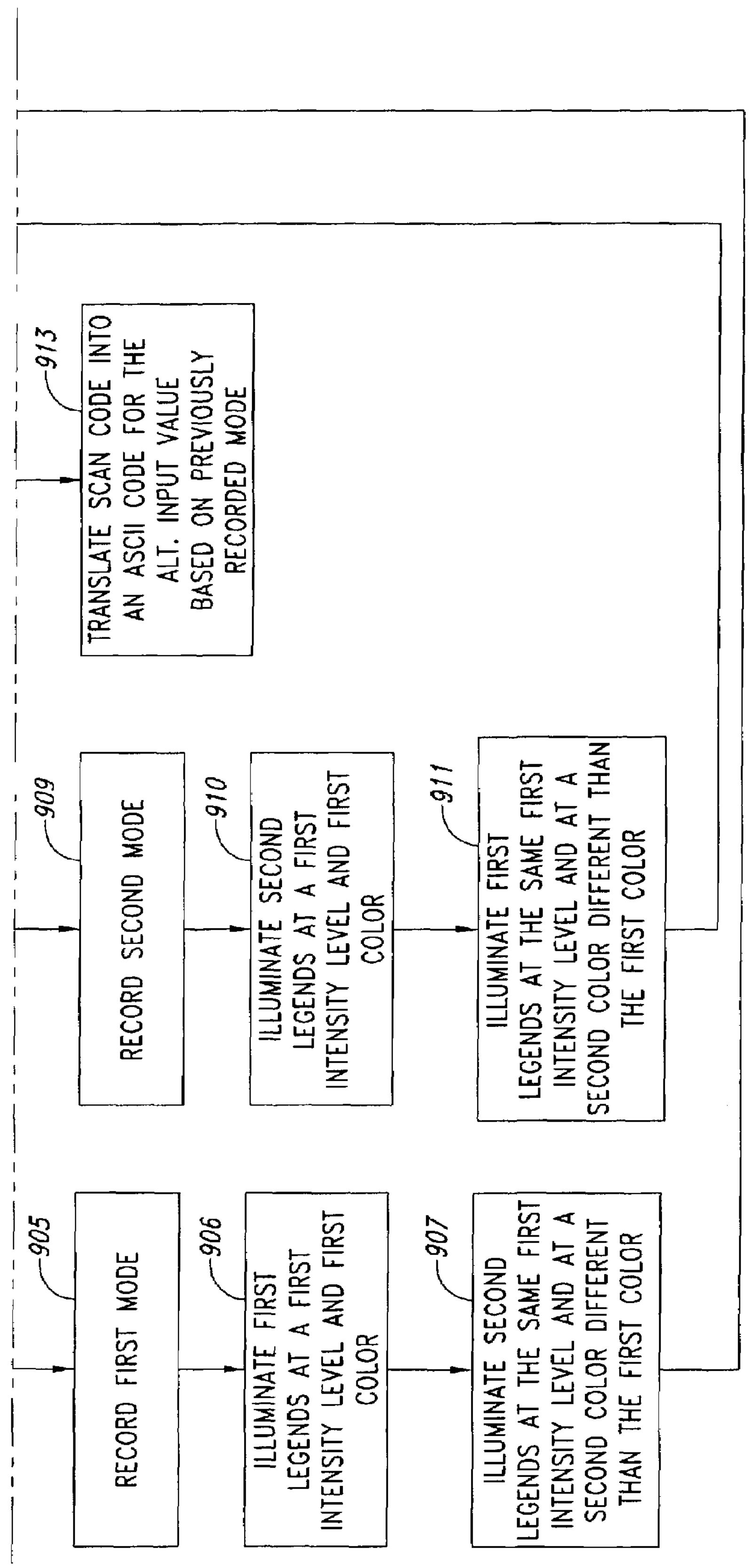

FIGS. 9A and 9B show a method 900 where the legends are illuminated at the same intensity, and the legends identifying the active input values are illuminated with a different color than the legends identifying the inactive legends. For the embodiment shown in FIG. 9, steps 901–905, steps 908–909, and steps 912–914 are similar to steps 701–705, steps 708–709, and steps 712–714 respectively, of the embodiment shown in FIG. 7. However, at step 906, as compared to step 706, when each of the first legends 20 are illuminated at a first intensity level, step 906 further includes illuminating each of the first legends 20 with a first color. At step 907, each of the second legends 22 are illuminated at the same intensity level as each of the first legends 20, and with a second color different than the first color. Similarly, at step 910, as compared to step 710, when each of the second legends 22 are illuminated at a first intensity level, step 910 further includes illuminating each of the second legends 22 with a second color. At step 911, each of the first legends 20 are illuminated at the same intensity level as each of the second legends 22, and with a second color different than the first color.

Figure 10A:
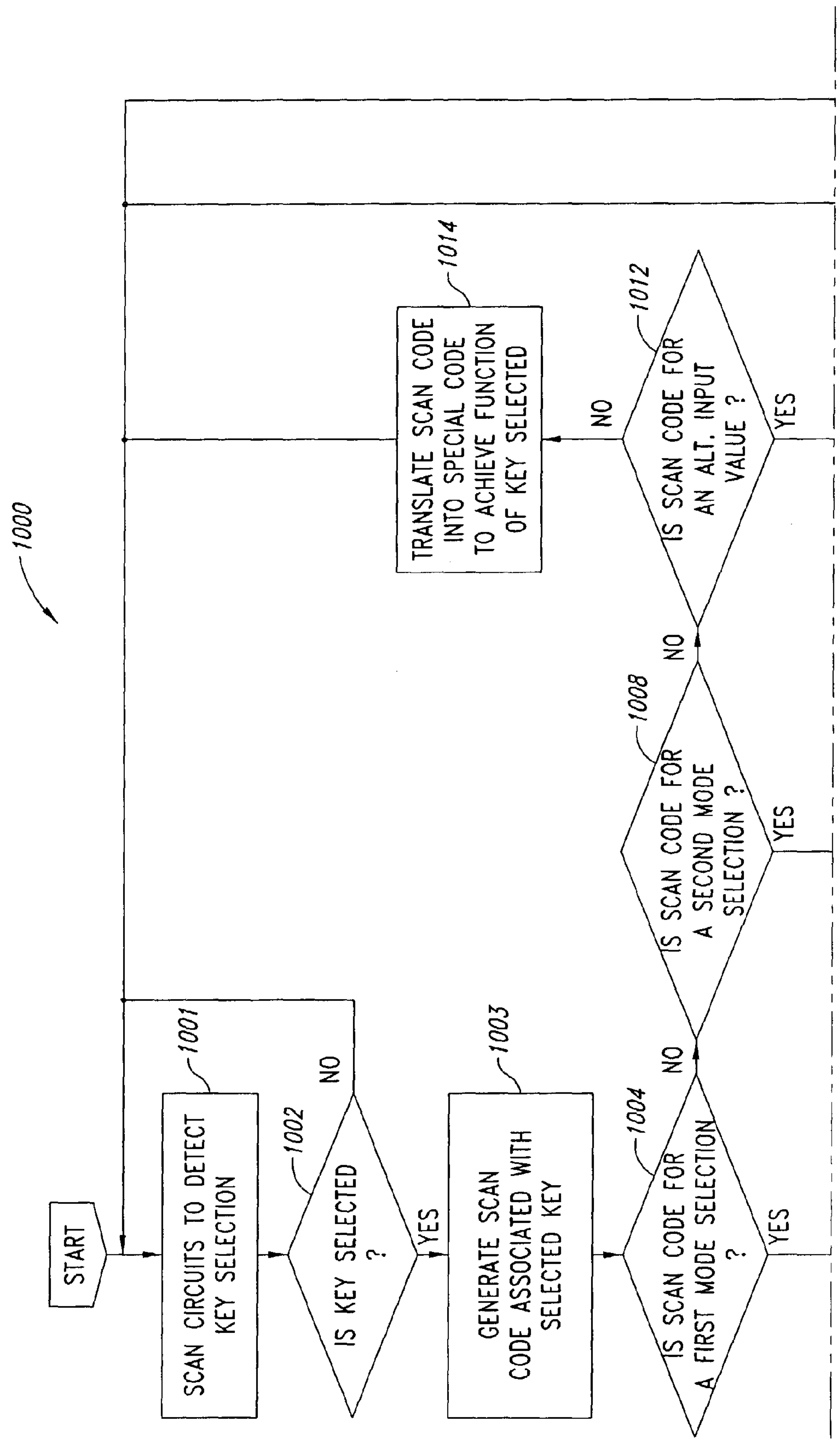
FIGS. 10A and 10B are a flow diagram of yet another illustrated method for controlling operation of a user input device in which the legends identifying the active input values are illuminated at a higher intensity and with a different color than the legends identifying the inactive input values.
Figure 10B:
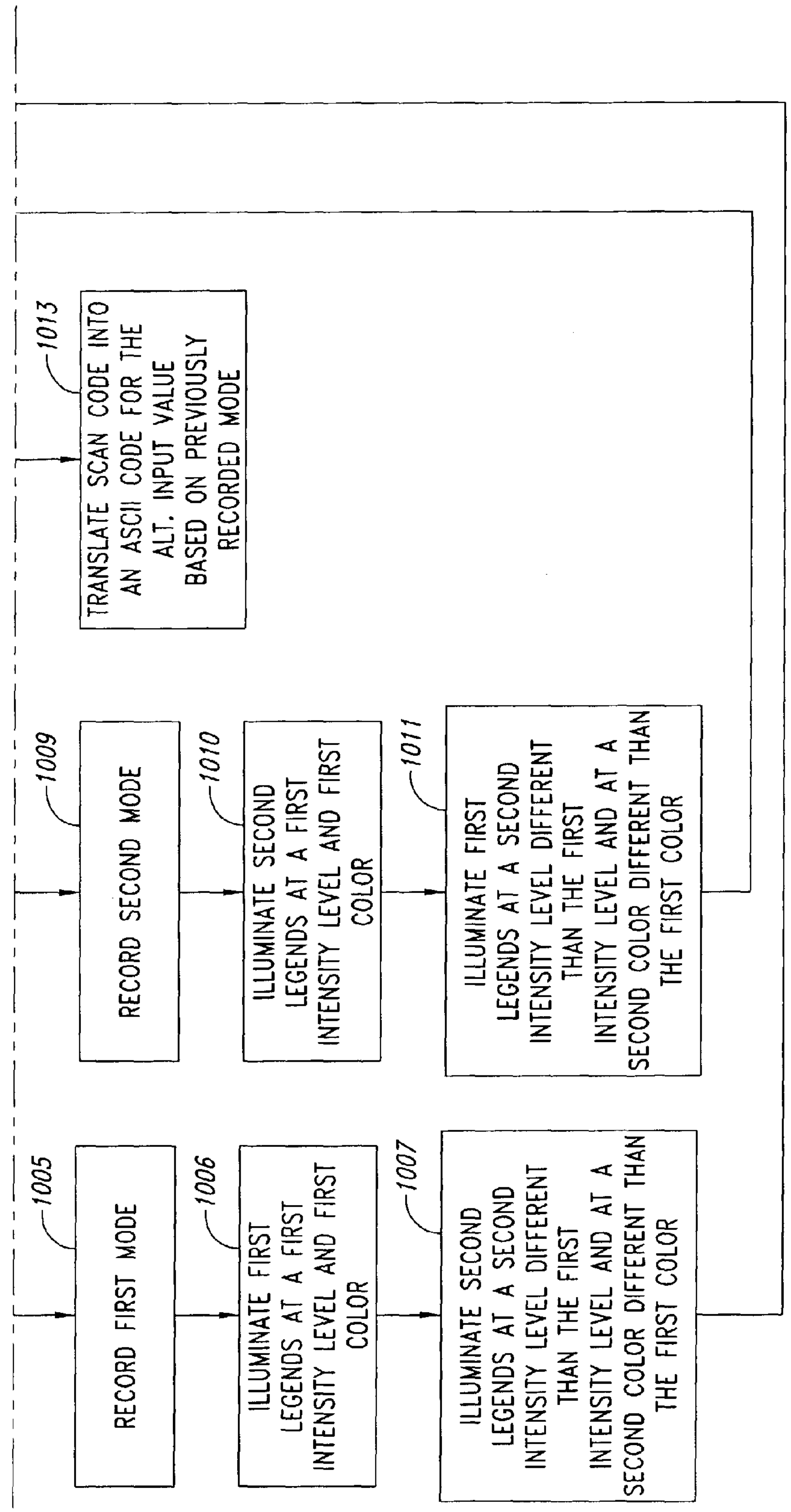

FIGS. 10A and 10B show a method 1000 where the legends identifying the active input values are illuminated at a higher intensity and with a different color than the legends identifying the inactive input values. For the embodiment shown in FIG. 10, steps 1001–1006, steps 1008–1010, and steps 1012–1014 are similar to steps 901–906, steps 908–910, and steps 912–914, respectively, of the embodiment shown in FIG. 9. However, at step 1007, as compared to step 907, when each of the second legends 22 are illuminated, they are illuminated at a second intensity level different than the first intensity level. Similarly, at step 1011, as compared to step 911, when each of the first legends 20 are illuminated, they are illuminated at a second intensity level different than the first intensity level.

Figure 11A:
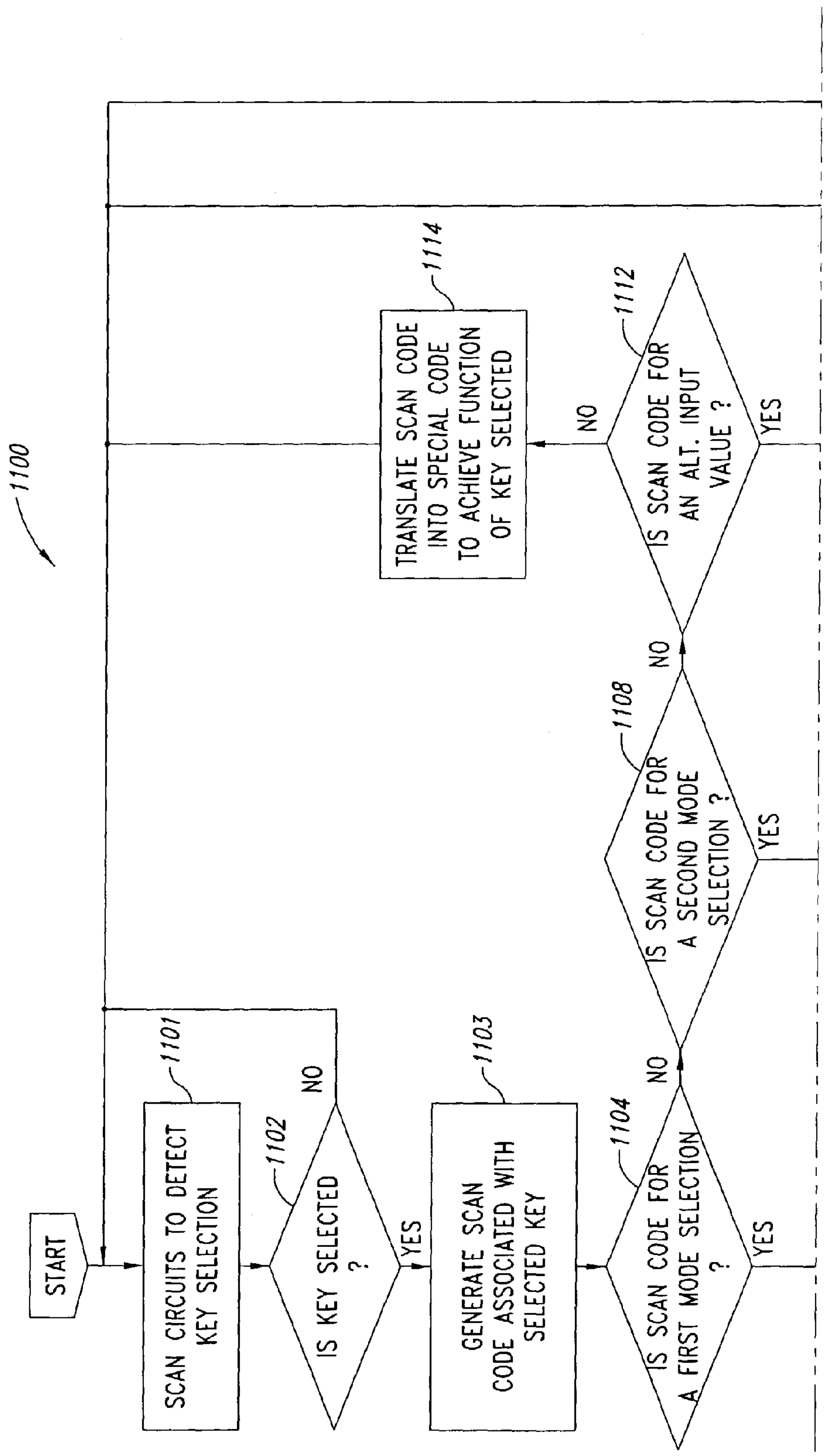
FIGS. 11A and 11B are a flow diagram of a further illustrated method for controlling operation of a user input device in which the legends are illuminated with the same color, and the legends identifying the active input values are illuminated at a higher intensity than the legends identifying the inactive input values.
Figure 11B:
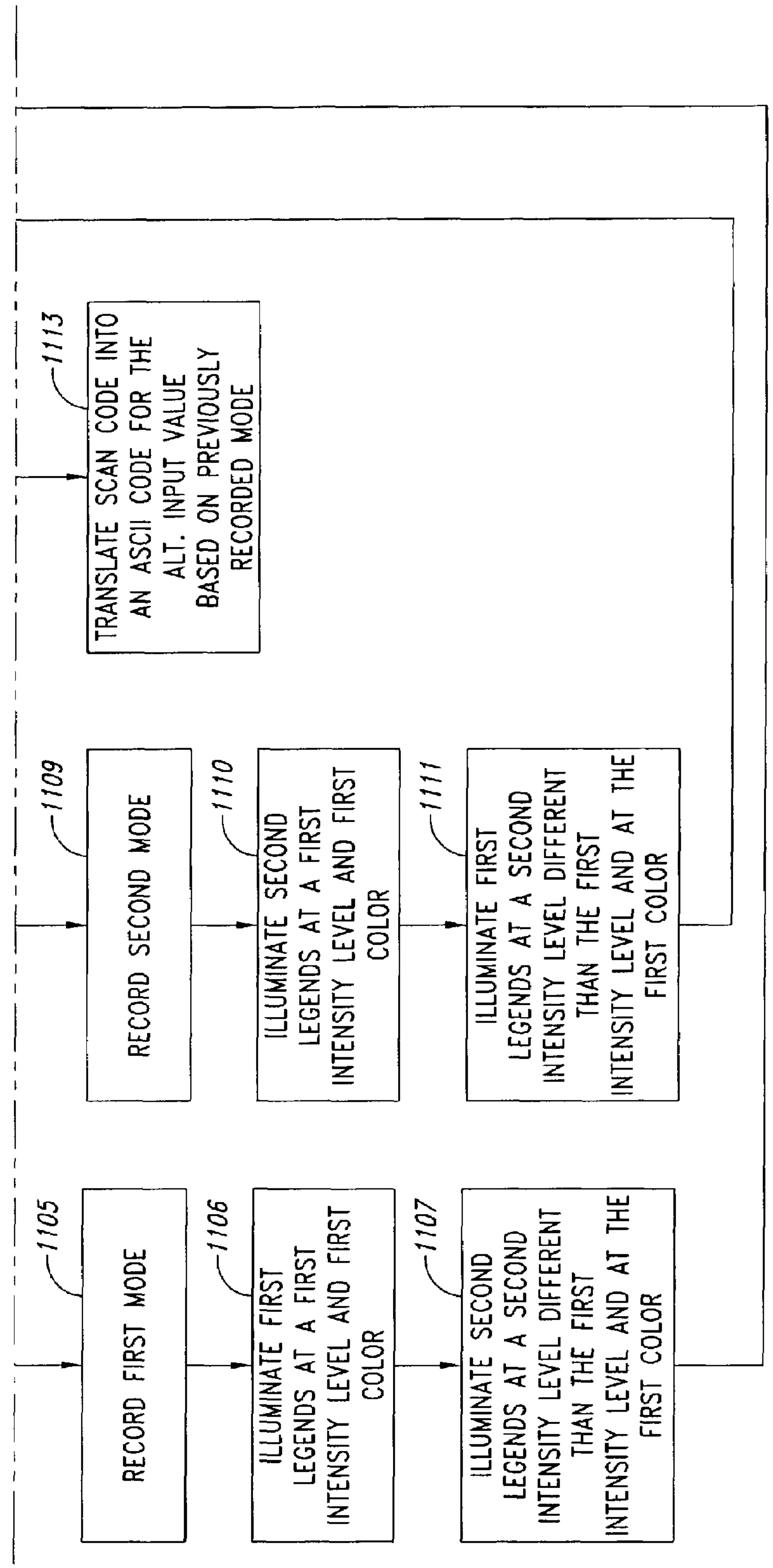

FIGS. 11A and 11B show a method 1100 where the legends are illuminated with the same color, and the legends identifying the active input values are illuminated at a higher intensity than the legends identifying the inactive input values. For the embodiment shown in FIG. 11, steps 1101–1106, steps 1108–1110, and steps 1112–1114 are similar to 1001–1006, steps 1008–1010, and steps 1012–1014, respectively. However, at step 1107, as compared to step 1007, when each of the second legends 22 are illuminated, they are illuminated with the same first color as each of first legends 20. Similarly, at step 1111, as compared to step 1011, when each of the first legends 20 are illuminated, they are illuminated with the same first color as each of the second legends 22.

Although specific embodiments of and examples for the user input device and method of the invention are described herein for illustrative purposes, various equivalent modifications can be made without departing from the spirit and scope of the invention, as will be recognized by those skilled in the relevant art. The teachings provided herein of the invention can be applied to other input devices, not necessarily the exemplary hand-held user input device generally described above.

Further, many of the methods may eliminate some steps, include other steps, and/or perform the steps in a different order than illustrated, as will become readily apparent to those skilled in the art. The various embodiments described above can be combined to provide further embodiments.

Aspects of the invention can be modified, if necessary, to employ systems, circuits and concepts of the various patents, applications and publications to provide yet further embodiments of the invention.

These and other changes can be made to the invention in light of the above-detailed description. In general, in the following claims, the terms used should not be construed to limit the invention to the specific embodiments disclosed in the specification and the claims, but should be construed to include all user input devices that operated in accordance with the claims. Accordingly, the invention is not limited by the disclosure, but instead its scope is to be determined entirely by the following claims.

What is claimed is:

1. A user input device, comprising:

at least a first light source operable to illuminate at least at a first intensity level of illumination and operable to illuminate at a second intensity level of illumination;

a plurality of user selectable switches, at least a number of the user selectable switches selectively operable to input at least two alternative input values; and for each of the number of the user selectable switches, at least a first and a second legend proximate the user selectable switch, each of the first and the second legends identifying a respective one of the alternative input values of the user selectable switch, the legends selectively illuminable to indicate an active one of the alternative input values of the user selectable switch at the first intensity level of illumination and to indicate an inactive one of the other alternative input values of the user selectable switch at the second intensity level of illumination, the second intensity level being different than the first intensity level.

2. The user input device of claim 1 wherein at least one of the plurality of user selectable switches is selectively operable to make a first set of input values active for each of the number of user selectable switches.

3. The user input device of claim 1 wherein at least one of the plurality of user selectable switches is selectively operable to make one of a first set of input values and a second set of input values active for each of the number of user selectable switches.

4. The user input device of claim 1 wherein a first one of the plurality of user selectable switches is selectively operable to make a first set of input values active for each of the number of user selectable switches; a second one of the plurality of user selectable switches is selectively operable to make a second set of input values active for each of the number of user selectable switches, and a third one of the plurality of user selectable switches is selectively operable to make a third set of input values active for each of the number of user selectable switches.

5. The user input device of claim 1 wherein at least one of the plurality of user selectable switches is selectively operable to input only a single input value.

6. The user input device of claim 1, further comprising:

at least a second light source;

a first plurality of optical fibers selectively coupling light from the first light source to the first legends of each of the number of user selectable switches; and a second plurality of optical fibers selectively coupling light from the second light source to the second legends of each of the number of user selectable switches.

7. The user input device of claim 1 wherein the at least one light source includes a plurality of light sources, each of the plurality of light sources selectively illuminating a respective one of the first and the second legends of each of the number of user selectable switches.

8. The user input device of claim 1 wherein the at least one light source includes a number of light sources of a first color and a number of light sources of a second color, each of the number of light sources of the first color selectively illuminating a respective one of the first legends of each of the number of user selectable switches and each of the number of light sources of the second color selectively illuminating a respective one of the second legends of each of the number of user selectable switches.

9. The user input device of claim 1 wherein the at least one light source includes a first and a second number of light sources, each of the first number of light sources selectively coupling light through a respective one of a first colored filter and illuminating a respective one of the first legends of each of the number of user selectable switches with a first color, and each of the second number of light sources selectively coupling light through a respective one of a second colored filter and illuminating a respective one of the second legends of each of the number of user selectable switches with a second color.

10. The user input device of claim 1 wherein the at least one light source includes a plurality of light sources, each of the plurality of light sources selectively coupling light through a plurality of filters, the plurality of filters including at least a first and a second colored filter with light coupling through the first colored filter of each of the plurality of filters illuminating a respective one of the first legends of each of the number of user selectable switches with a first color and light coupling through the second colored filter of each of the plurality of filters illuminating a respective one of the second legends of each of the number of user selectable switches with a second color.

11. The user input device of claim 1 wherein the legends are selectively illuminable by adjusting an intensity of the illumination of each legend based on which of the alternative input values of the user selectable switch will be input by user selection of the user selectable switch.

12. The user input device of claim 1 wherein for each of the number of user selectable switches, a legend indicating the active one of the alternative input values of the user selectable switch is illuminated at a higher intensity level than a legend indicating an inactive one of the alternative input values of the user selectable switch.

13. The user input device of claim 1 wherein for each of the number of user selectable switches, a legend indicating the active one of the alternative input values of the user selectable switch is the only one of the legends identifying the alternative input values of the user selectable switch that is illuminated.

14. The user input device of claim 1 wherein the user input device is one of a keyboard and a keypad wherein each of the user selectable switches is coupled to a respective key.

15. The user input device of claim 1 wherein each of the user selectable switches is coupled to a respective key, a respective one of a number of keys being coupled to a respective one of the number of user selectable switches, and each of the respective one of the number of keys bearing at least a respective one of the legends of each of the number of user selectable switches.

16. The user input device of claim 1 wherein a respective one of a number of keys is coupled to a respective one of the number of user selectable switches, the first legend of each of the number of user selectable switches being located on the respective one of the number of keys, and the second legend of each of the number of user selectable switches being located proximate to the respective one of the number of keys.

17. A method of operating a user input device having a number of user selectable switches, wherein each of the number of user selectable switches is selectively operable to input at least two alternative input values, has at least a first and a second legend identifying a respective one of the alternative input values, and is selectively illuminable to indicate an active one of the alternative input values, the method comprising:

receiving a first user input to activate a respective first one of the alternative input values for each of the number of user selectable switches;

in response to the first user input, activating the respective first one of the alternative input values for each of the number of user selectable switches and illuminating the first legend of each of the number of user selectable switches at a first intensity level of illumination; and in further response to the first user input, inactivating the respective second one of the alternative input values for each of the number of user selectable switches and illuminating the second legend of each of the number of user selectable switches at a second intensity level of illumination, the second intensity level being different than the first intensity level.

18. The method of claim 17, further comprising:

receiving a second user input to activate a respective second one of the alternative input values for each of the number of user selectable switches;

activating the respective second one of the alternative input values for each of the number of user selectable switches in response to the second user input;

illuminating the second legend of each of the number of user selectable switches at the first intensity level in response to the second user input; and illuminating the first legend of each of the number of user selectable switches at the second intensity level different than the first intensity level in response to the second user input.

19. The method of claim 17, further comprising:

illuminating the second legend of each of the number of user selectable switches at the second intensity level in response to the first user input, the second intensity level being different than the first intensity level.

20. The method of claim 17, further comprising:

illuminating the second legend of each of the number of user selectable switches at a zero intensity level in response to the first user input.

21. The method of claim 17, further comprising:

illuminating the second legend of each of the number of user selectable switches at the first intensity level in response to the first user input; and wherein illuminating the first legend of each of the number of user selectable switches includes casting a first color from each of the illuminated first legends, and illuminating the second legend of each of the number of user selectable switches includes casting a second color from each of the illuminated second legends, the second color being different than the first color.

22. The method of claim 17, wherein illuminating the first legend of each of the number of user selectable switches includes casting a first color from each of the illuminated first legends, and illuminating the second legend of each of the number of user selectable switches includes casting a second color from each of the illuminated second legends, the second color being different than the first color.

23. The method of claim 17, wherein illuminating the first legend and the second legends of each of the number of user selectable switches includes casting a first same color from each of the illuminated first and second legends.

24. The method of claim 17 further comprises:

illuminating the first legend of each of the user selectable switches at the second intensity level when each of the alternative input values for each of the respective user selectable switches are inactive;

illuminating the second legend of each of the user selectable switches at the second intensity level when each of the alternative input values for each of the respective user selectable switches are inactive; and wherein illuminating the first legend of each of the user selectable switches at the second intensity level includes casting a first color from each of the illuminated first legends, and illuminating the second legend of each of the number of user selectable switches includes casting a second color from each of the illuminated second legends, the second color being different than the first color.

* * * * *